Patented July 23, 1940

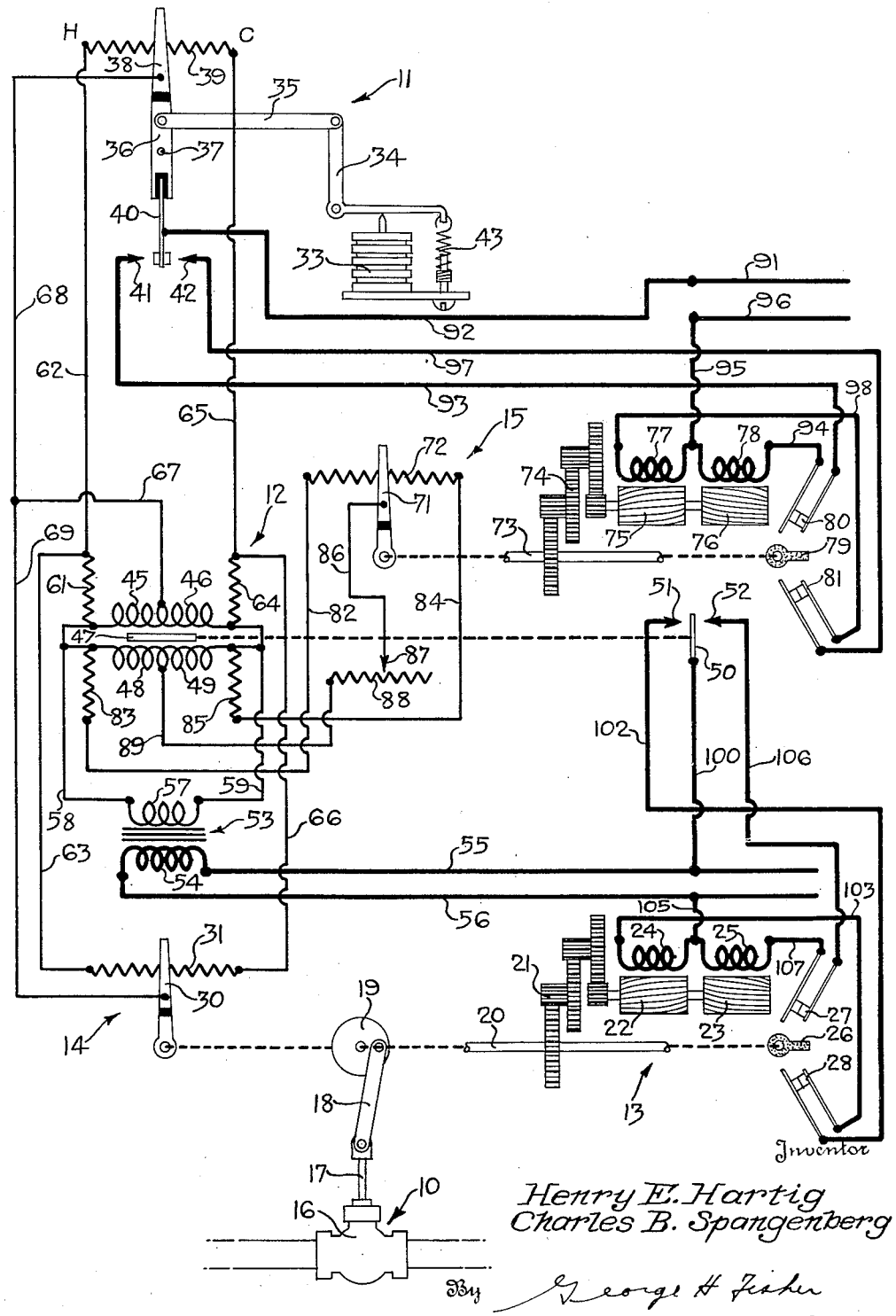

2,208,762

UNITED STATES PATENT OFFICE 2,208,762

LOAD COMPENSATED CONTROL SYSTEM

Henry E. Hartig, Robbinsdale, and Charles B. Spangenberg, Minneapolis, Minn., assignors to Minneapolis-Honeywell Regulator Company, Minneapolis, Minn., a corporation of Delaware Application November 23, 1936, Serial No. 112,340

12 Claims. (Cl. 236—78)

This invention relates to automatic reset or load compensation mechanism as applied to a follow-up control system.

It is an object of this invention to provide a follow-up control system which controls the value of a condition along with a novel automatic reset or load compensation mechanism for maintaining the value of the condition to be controlled substantially constant regardless of changes in load.

Another object is to provide a simple means for varying the rate of reset so that the system may be adapted for universal application.

The construction and mode of operation of the combined follow-up control system and automatic reset mechanism also form objects of this invention.

Other objects and advantages will become apparent to those skilled in the art upon reference to the accompanying specification, claims and drawing.

For a more thorough understanding of this invention reference is made to the accompanying single sheet of drawing, in which is diagrammatically disclosed the preferred form of this invention.

Referring now to the drawing, a device to be positioned in a plurality of positions for controlling the value of a condition is generally designated at 10. Control means the state of which is varied in accordance with changes in the value of the condition to be controlled is generally designated at 11. The control means 11 is adapted to control the operation of a relay generally designated at 12. The relay 12 positions a motor generally designated at 13 which in turn positions the device 10 and also operates a follow-up means generally designated at 14. The follow-up means 14 also controls the operation of the relay 12 to provide a true follow-up system. An automatic reset mechanism generally designated at 15 further controls the operation of the relay 12 to maintain the value of the condition to be controlled at the desired normal value regardless of changes in load.

Although the control system of this invention may be utilized for controlling any desired condition it is disclosed for purposes of illustration as controlling a temperature condition and more particularly the temperature of a space, not shown. Therefore, the device 10 which is positioned in a plurality of positions is shown to comprise a valve 16 for controlling the supply of heating fluid to the space. The valve 16 may be operated by a valve stem 17 which is connected by a pitman 18 to a crank disc 19 carried by a shaft 20 of the motor 13. The shaft 20 is operated through a reduction gear train 21 by motor rotors 22 and 23. The rotors 22 and 23 are operated by field windings 24 and 25, the arrangement being such that when the field winding 24 is energized the valve 16 is moved towards an open position and when the field winding 25 is energized the valve 16 is moved toward a closed position.

The shaft 20 also operates an abutment member 26 for opening limit switches 27 and 28 when the valve 16 is moved to an extreme closed position and an extreme open position respectively. The shaft 20 also operates a slider 30 with respect to a resistance element 31. The slider 30 and the resistance element 31 form a balancing impedance means or potentiometer and therefore comprise the follow-up means 14. When the valve 16 is moved towards an open position the slider 30 is moved towards the left and when the valve 16 is moved towards a closed position the slider 30 is moved towards the right.

The control means generally designated at 11 is shown to be a thermostatic control means having a thermostatic element 33 responsive to variations in space temperature. Thermostatic element 33 may be of the usual bellows type containing a volatile fluid. Thermostatic device 33 operates a bell crank lever 34 which is connected by a crank 35 to a lever 36 pivoted at 37. Lever 36 carries a slider 38 which is adapted to slide across a resistance element 39. The slider 38 and the resistance element 39 form a control impedance means in the form of a potentiometer. The lever 36 also operates a resilient switch arm 40 with respect to contacts 41 and 42. The temperature setting of the thermostatic control means may be adjusted by suitably adjusting the tension in a spring 43 connected to the bell crank lever 34. Upon an increase in space temperature the bellows 33 expands and moves the slider 38 to the left in the direction indicated by the character H and moves the switch arm 40 into engagement with the contact 42. Upon a decrease in space temperature the bellows 33 contracts and the slider 38 is moved to the right in the direction indicated by the character C and the switch arm 40 is moved into engagement with the contact 41. When the space temperature is at the desired normal value the slider 38 is maintained in the mid position with respect to the resistance element 39 and the switch arm 40 is maintained spaced midway between the contacts 41 and 42 as shown in the drawing. This represents the desired normal state of the control means.

The relay generally designated at 12 may comprise electrical operating means such as relay coils 45 and 46 for moving an armature 47. The relay 12 also includes other electrical operating means such as relay coils 48 and 49 for further operating the armature 47. The armature 47 is suitably connected to a switch arm 50 which is adapted to engage spaced contacts 51 and 52.

Omitting the effect of the relay coils 48 and 49, the switch arm 50 is moved into engagement with the contact 51 when the relay coil 45 is energized more than the relay coil 46 and the switch arm 50 is moved into engagement with the contact 52 when the relay coil 46 is energized more than the relay coil 45. In a like manner, omitting the controlling effect of the relay coils 45 and 46 the switch arm 50 is moved into engagement with the contact 51 when the relay coil 48 is energized more than the relay coil 49 and is moved into engagement with the contact 52 when the relay coil 49 is energized more than the relay coil 48. Therefore, it is seen that when the total energizations of the relay coils 45 and 48 are greater than the total energizations of the relay coils 46 and 49, the switch arm 50 is moved into engagement with the contact 51. When the total energizations of the relay coils 46 and 49 are greater than the total energizations of the relay coils 45 and 48, the switch arm 50 is moved into engagement with the contact 52. When the energizations of the relay coils 45 and 48 are equal to the energizations of the relay coils 46 and 49 the switch arm 50 is maintained spaced midway between the contacts 51 and 52 as shown in the drawing.

Power is supplied to the relay 12 by means of a step down transformer 53 having a primary 54 connected across line wires 55 and 56 and a secondary 57. One end of the secondary 57 is connected by a wire 58 to the left ends of the relay coils 45 and 48. The other end of the secondary 57 is connected by a wire 59 to the right ends of the relay coils 46 and 49. The adjacent ends of the relay coils 45 and 46 and the relay coils 48 and 49 are connected together. By reason of these connections it is seen that the relay coils 45 and 46 are connected in series across the secondary 57 of the transformer and also that the relay coils 48 and 49 are connected in series and across the secondary 57. The left end of the relay coil 45 is connected by a protective resistance 61 and wires 62 and 63 to the left ends of the control potentiometer resistance element 39 and the balancing potentiometer resistance element 31. In a like manner the right end of the relay coil 46 is connected by a protective resistance 64 and wires 65 and 66 to the right ends of the control potentiometer resistance element 39 and the balancing potentiometer resistance element 31. The junction of the relay coils 45 and 46 is connected by wires 67, 68 and 69 to the slider 38 of the control potentiometer and the slider 30 of the balancing potentiometer. By reason of these wiring connections it is seen that the control potentiometer and the balancing potentiometer are connected in parallel with the series connected relay coils 45 and 46 and across the secondary 57.

Omitting for the time being the action of the relay coils 48 and 49 it is assumed that the parts are in the position shown in the drawing. The space temperature is at the desired normal value and the valve 16 is in a midposition for supplying just the correct amount of heat to make up for the heat losses from the space. Upon an increase in the heating load the space temperature decreases and the slider 38 is moved to the right in the direction indicated by the character C. By reason of the above referred to parallel relationship this right-hand movement of the slider 38 decreases the energizations of the relay coil 46 and increases the energization of the relay coil 45 to move the switch arm 50 into engagement with the contact 51 to complete a circuit from the line wire 55 through wire 100, switch arm 50, contact 51, wire 102, limit switch 28, wire 103, field winding 24 and wire 105 back to the other line wire 56. Completion of this circuit energizes the field winding 24 to move the valve 16 towards an open position which increases the supply of heat to the space. Operation of the motor 13 to move the valve 16 towards an open position also moves the slider 30 of the balancing potentiometer to the left. Movement of the slider 30 to the left decreases the energization of the relay coil 45 and increases the energization of the relay coil 46. When the slider 30 has moved sufficiently far to the left to rebalance the energizations of the relay coils 45 and 46 the switch arm 50 is moved out of engagement with the contact 51 to break the circuit through the field winding 24. In this manner the valve 16 is modulated towards an open position in direct accordance with the amount of decrease in space temperature.

Upon a decrease in the heating load which causes an increase in space temperature the slider 38 of the control potentiometer is moved to the left in the direction indicated by the character H. This left-hand movement of the slider 38 decreases the energization of the relay coil 45 and increases the energization of the relay coil 46 whereupon the switch arm 50 is moved into engagement with the contact 52 to complete a circuit from the line wire 55 through wire 100, switch arm 50, contact 52, wire 106, limit switch 27, wire 107, field winding 25 and wire 105 back to the other line wire 56. Completion of this circuit energizes the field winding 25 to move the valve 16 towards a closed position to decrease the supply of heat to the space. Operation of the motor 13 to move the valve 16 towards a closed position also causes right-hand movement of the slider 30 of the balancing potentiometer. This right-hand movement of the slider 30 decreases the energization of the relay coil 46 and increases the energization of the relay coil 45. When the slider 30 has moved sufficiently far to the right to rebalance the energization of the relay coils 45 and 46 the switch arm 50 is moved out of engagement with the contact 52 to break the circuit through the field winding 25. In this manner the valve 16 is modulated towards a closed position in direct accordance with the amount of increase in space temperature.

By reason of the above construction and mode of operation a true follow-up control system is afforded. It is found that if the control range of the control potentiometer is made sufficiently narrow to give accurate temperature control "hunting" is likely to occur. Also it is found that if the control range is made sufficiently wide to prevent "hunting" a noticeable "droop" in the space temperature becomes apparent, that is, the space temperature is maintained at a lower value when the heating load is relatively great than when the heating load is relatively light. In order to eliminate "hunting" the control range of the control potentiometer is widened and in order to eliminate the "drooping" characteristic of the follow-up control system the automatic reset mechanism generally designated at 15 is utilized.

The automatic reset mechanism 15 may comprise a compensating impedance means in the form of a potentiometer formed by a slider 71 adapted to slide across a resistance element 72. Slider 71 is operated by a shaft 73 which is driven through a reduction gear train 74 by motor rotors 75 and 76. The rotors 75 and 76 are controlled by field windings 77 and 78. The arrangement is such that when the field winding 78 is energized the slider 71 is moved to the right and when the field winding 77 is energized the slider 71 is moved to the left. Shaft 73 also operates an abutment member 79 for opening limit switches 80 and 81 when the slider 71 is moved to an extreme right-hand position or an extreme left-hand position respectively. The left end of the compensating potentiometer resistance element 72 is connected by a wire 82 and a protective resistance to the left end of the relay coil 48. The right end of the compensating potentiometer resistance element 72 is connected by a wire 84 and a protective resistance 85 to the right end of the relay coil 49. Slider 71 of the compensating potentiometer is connected by wire 86 to a contact 87 which is adapted to be manually positioned with respect to a resistance element 88. The contact 87 and the resistance element 88 form an adjustable impedance means or rheostat. Resistance element 88 is connected by a wire 89 to the junction of the relay coils 48 and 49. By reason of these wiring connections it is seen that the compensating potentiometer is connected in parallel with the series connected relay coils 48 and 49 and across the secondary 57.

In order to explain the operation of the follow-up system in combination with the reset mechanism it is assumed that the parts are in the position shown in the drawing. Upon an increase in the heating load the space temperature decreases and the slider 38 is moved to the right in the direction indicated by the character C. This increases the energization of the relay coil 45 and decreases the energization of the relay coil 46 to move the valve 16 towards an open position and to move the slider 30 to the left to rebalance the energization of the relay coils 45 and 46. In this manner the valve 16 is modulated towards an open position in accordance with the amount of decrease in space temperature as pointed out above. A decrease in space temperature also moves the switch arm 40 into engagement with the contact 41 to complete a circuit from a line wire 91 through wire 92, switch arm 40, contact 41, wire 93, limit switch 80, wire 94, field winding 78 and wire 95 back to the other line wire 96. Completion of this circuit energizes the field winding 78 to move the slider 71 towards the right. Movement of the slider 71 towards the right decreases the energization of the relay coil 49 and increases the energization of the relay coil 48, whereupon the switch arm 50 is moved into engagement with the contact 51. This causes further opening movement of the valve 16 and left-hand movement of the slider 30. This left-hand movement of the slider 30 unbalances the energization of the relay coils 45 and 46 to decrease the energization of coil 45 and increase the energization of coil 46. When the total energizations of the relay coils 45 and 48 equals the total energization of the relay coils 46 and 49, the switch arm 50 moves out of engagement with the contact 51 and the valve 16 is maintained in the new position. Therefore, as long as the slider 71 is moving towards the right the valve 16 is being positioned further towards an open position and the slider 71 will continue in its movement towards the right as long as the space temperature is less than the desired normal value. As a result of this additional opening movement of the valve 16 additional heat is supplied to the space to restore the space temperature to the desired normal value. When this happens the switch arm 40 moves out of engagement with the contact 41 to break the circuit through the field winding 78 and prevent further right-hand movement of the slider 71. The valve 16 is therefore re-positioned or reset towards the open position by the automatic reset mechanism 15 in direct accordance with the amount of the increase in heating load.

Upon a decrease in the heating load the space temperature increases and the slider 38 of the control potentiometer is moved to the left in the direction indicated by the character H. The motor 13 is thereupon operated to move the valve 16 toward a closed position and to move the slider 30 of the balancing potentiometer to the right to rebalance the energization of the relay coils 45 and 46. The valve 16 is therefrom modulated towards a closed position in accordance with the amount of increase in space temperature in the manner pointed out above. An increase in space temperature caused by the decrease in heating load also moves the switch arm 40 into engagement with the contact 42 to complete a circuit from the line wire 91 through wire 92, switch arm 40, contact 42, wire 97, limit switch 81, wire 98, field winding 77 and wire 95 back to the other line wire 96. Completion of this circuit energizes the field winding 77 to move the slider 71 of the compensating potentiometer towards the left. Movement of the slider 71 of the compensating potentiometer towards the left decreases the energization of the relay coil 48 and increases the energization of the relay coil 49 to move the switch arm 50 into engagement with the contact 52 whereupon the field winding 25 is energized and the valve 16 is moved further towards a closed position. Movement of the valve 16 towards a closed position causes right-hand movement of the slider 30 of the balancing potentiometer which decreases the energization of the relay coil 46 and increases the energization of the relay coil 45. When the slider 30 has moved sufficiently far towards the right so that the total energizations of the relay coils 45 and 48 equal the total energizations of the relay coils 46 and 49, the switch arm 50 is moved out of engagement with the contact 52 and further opening movement of the valve 16 is stopped. As long as the space temperature is above the desired normal value the slider 71 of the compensating potentiometer will continue in its left-hand movement and the valve 16 will be continued in its movement towards the closed position. By reason of this additional decrease in the supply of heat to the space the increase in load is compensated for and the slider 38 of the control potentiometer is moved back to the mid position as shown in the drawing and also the switch arm 40 is moved out of engagement with the contact 42. When the switch arm 40 moves out of engagement with the contact 42 the field winding 77 is deenergized and further left-hand movement of the slider 71 of compensating potentiometer is stopped. Therefore, the valve 16 is repositioned or reset further towards a closed position with respect to the value of the space temperature in direct accordance with the amount of decrease in the heating load.

By reason of the above construction and mode of operation a control system is provided wherein the space temperature is maintained at a substantially constant value without "hunting" and regardless of changes in the heating load. In order to properly adjust the control system so that its application may be universal, some means must be provided for adjusting the rate of reset. That is, some means must be provided for adjusting the rate at which the valve 16 is further positioned towards its open or closed positions. This rate adjustment is accomplished by means of the rheostat connected in series with the slider 71 of the compensating potentiometer. By adjusting the rheostat the relative unbalance of the energizations of the relay coils 48 and 49 are adjusted. By moving the contact 87 to the right to increase the resistance in series with the slider 71 of the compensating potentiometer the unbalance of the energization of the relay coil 48 is decreased and therefore a less amount of movement of the slider 30 of the balancing potentiometer is required to rebalance the relay 12. It follows, then, that if less amount of movement of the slider 30 is necessary the valve 16 will not be repositioned as rapidly or as far and therefore the rate of reset of the valve 16 is decreased. By moving the contact 87 of the rheostat to the left to decrease the resistance in series with the slider 71 of the compensating potentiometer the relative unbalance of the energizations of the relay coils 48 and 49 is increased and a greater movement of the slider 30 of the balancing potentiometer is required to rebalance the relay 12. It follows then that if a greater amount of movement of the slider 30 is required to rebalance the relay 12 the valve 16 will be repositioned or reset further towards the open or closed position a greater amount and at a faster rate. This simple manner of adjusting the rate of reset is made possible by reason of the compensating potentiometer being connected magnetically as distinguished from electrically to the remainder of the follow-up control system.

From the above it is seen that we have provided a follow-up control system along with a novel automatic reset or load compensation mechanism whereby the value of a condition may be maintained at a substantially constant value regardless of changes in load and wherein simple means are provided for adjusting the rate of reset.

Although for purposes of illustration we have disclosed one form of this invention, other forms thereof may become obvious to those skilled in the art upon reference to this specification and therefore this invention is to be limited only by the scope of the appended claims and the prior art.

We claim as our invention:

1. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means adjusted as an incident to deviation of the value of the condition to be controlled from the desired normal value, other electrical operating means for positioning said control member, and electrical connections between the compensating impedance means and the other electrical operating means for positioning said device differently with respect to the value of the condition to be controlled.

2. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means, reversible motor means operated as an incident to deviation of the value of the condition to be controlled from the desired normal value for adjusting the compensating impedance means, other electrical operating means for positioning said control member, and electrical connections between the compensating impedance means and the other electrical operating means.

3. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means, reversible motor means operated in response to deviation of the value of the condition to be controlled from the desired normal value for adjusting the compensating impedance means, other electrical operating means for positioning said control member, and electrical connections between the compensating impedance means and the other electrical operating means.

4. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means adjusted as an incident to deviation of the value of the condition to be controlled from the desired normal value, other electical operating means for positioning said control member, electrical connections between the compensating impedance means and the other electrical operating means for positioning said device differently with respect to the value of the condition to be controlled, and means for adjusting the operating effect of the other electrical operating means on the control member.

5. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means, reversible motor means operated as an incident to deviation of the value of the condition to be controlled from the desired normal value for adjusting the compensating impedance means, other electrical operating means for positioning said control member, and electrical connections between the compensating impedance means and the other electrical operating means, and means for adjusting the operating effect of the other electrical operating means on the control member.

6. In combination, a device to be positioned in a plurality of positions for controlling the value of a condition, adjustable control impedance means adjusted in accordance with changes in the value of the condition to be controlled, relay means including inductance means and an armature controlled thereby for positioning said device, connections between the control impedance means and the inductance means for positioning said device in response to changes in the value of the condition to be controlled, adjustable compensating impedance means adjusted as an incident to deviation of the value of the condition to be controlled from the desired normal value, other inductance means for controlling the armature, and connections between the compensating impedance means and the other inductance means.

7. In combination, a device to be positioned in a plurality of positions for controlling the value of a condition, an adjustable control potentiometer adjusted in accordance with changes in the value of the condition to be controlled, relay means including inductance means and an armature controlled thereby for positioning said device, connections between the control potentiometer and the inductance means for positioning said device in response to changes in the value of the condition to be controlled, an adjustable compensating potentiometer adjusted as an incident to deviation of the value of the condition to be controlled from the desired normal value, other inductance means for controlling the armature, and connections between the compensating potentiometer and the other inductance means.

8. In combination, a device to be positioned in a plurality of positions for controlling the value of a condition, adjustable control impedance means adjusted in accordance with changes in the value of the condition to be controlled, relay means including inductance means and an armature controlled thereby for positioning said device, connections between the control impedance means and the inductance means for positioning said device in response to changes in the value of the condition to be controlled, adjustable compensating impedance means adjusted as an incident to deviation of the value of the condition to be controlled from the desired normal value, other inductance means for controlling the armature, connections between the compensating impedance means and the other inductance means, and means for adjusting the controlling effect of the other inductance means on the armature.

9. In combination, a device to be positioned in a plurality of positions for controlling the value of a condition, an adjustable control potentiometer adjusted in accordance with changes in the value of the condition to be controlled, relay means including inductance means and an armature controlled thereby for positioning said device, connections between the control potentiometer and the inductance means for positioning said device in response to changes in the value of the condition to be controlled, an adjustable compensating potentiometer adjusted as an incident to deviation of the value of the condition to be controlled from the desired normal value, other inductance means for controlling the armature, connections between the compensating potentiometer and the other inductance means, and means for adjusting the controlling effect of the other inductance means on the armature.

10. In combination, a device to be positioned in a plurality of positions for controlling the value of a condition, adjustable control impedance means adjusted in accordance with changes in the value of the condition to be controlled, means including electrical operating means and a control member positioned thereby for positioning said device, electrical connections between the control impedance means and the electrical operating means to position said device in accordance with changes in the value of the condition to be controlled, adjustable compensating impedance means adjusted as an incident to deviation of the value of the condition to be controlled from the desired normal value, other electrical operating means for positioning said control member, electrical connections between the compensating impedance means and the other electrical operating means for positioning said device differently with respect to the value of the condition to be controlled, and means for adjusting the operating effect of the other electrical operating means on the control member, said last mentioned means including adjustable impedance means in the last mentioned electrical connections.

11. In combination, a device to be positioned in a plurality of positions for controlling the value of a condition, adjustable control impedance means adjusted in accordance with changes in the value of the condition to be controlled, relay means including inductance means and an armature controlled thereby for positioning said device, connections between the control impedance means and the inductance means for positioning said device in response to changes in the value of the condition to be controlled, adjustable compensating impedance means adjusted as an incident to deviation of the value of the condition to be controlled from the desired normal value, other inductance means for controlling the armature, connections between the compensating impedance means and the other inductance means, and means for adjusting the controlling effect of the other inductance means on the armature, said last mentioned means including adjustable impedance means in the last mentioned connections.

12. In combination, a device to be positioned in a plurality of positions for controlling the value of a condition, an adjustable control potentiometer adjusted in accordance with changes in the value of the condition to be controlled, relay means including inductance means and an armature controlled thereby for positioning said device, connections between the control potentiometer and the inductance means for positioning said device in response to changes in the value of the condition to be controlled, an adjustable compensating potentiometer adjusted as an incident to deviation of the value of the condition to be controlled from the desired normal value, other inductance means for controlling the armature, connections between the compensating potentiometer and the other inductance means, and means for adjusting the controlling effect of the other inductance means on the armature, said last mentioned means including adjustable resistance means in the last mentioned connections.

HENRY E. HARTIG.
CHARLES B. SPANGENBERG.